US012152749B2

(12) United States Patent
Misuge

(10) Patent No.: US 12,152,749 B2
(45) Date of Patent: Nov. 26, 2024

(54) LENS FOR VEHICULAR HEADLIGHT, AND VEHICULAR HEADLIGHT

(71) Applicant: Ichikoh Industries, Ltd., Isehara (JP)

(72) Inventor: Hiroshi Misuge, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/636,517

(22) PCT Filed: Aug. 20, 2020

(86) PCT No.: PCT/JP2020/031465
§ 371 (c)(1),
(2) Date: Feb. 18, 2022

(87) PCT Pub. No.: WO2021/033746
PCT Pub. Date: Feb. 25, 2021

(65) Prior Publication Data
US 2022/0290833 A1 Sep. 15, 2022

(30) Foreign Application Priority Data
Aug. 20, 2019 (JP) ................................ 2019-150595

(51) Int. Cl.
*F21S 41/27* (2018.01)
*F21S 41/148* (2018.01)
(Continued)

(52) U.S. Cl.
CPC ............ *F21S 41/27* (2018.01); *F21S 41/148* (2018.01); *F21S 41/321* (2018.01);
(Continued)

(58) Field of Classification Search
CPC ........ F21S 41/322; F21S 41/25; F21S 41/255; F21S 41/27; F21S 41/275; F21S 41/265; F21V 7/0091
See application file for complete search history.

(56) References Cited

U.S. PATENT DOCUMENTS

2013/0335990 A1* 12/2013 Sato ........................ F21S 41/25
362/538

FOREIGN PATENT DOCUMENTS

AT 512181 B1 * 6/2013 ............ B60K 11/04
CN 103225780 A 7/2013
(Continued)

OTHER PUBLICATIONS

Machine translation of JP 2011181365 A retrieved from the FIT database of PE2E search. (Year: 2023).*
(Continued)

*Primary Examiner* — Colin J Cattanach
(74) *Attorney, Agent, or Firm* — Oblon, McClelland, Maier & Neustadt, L.L.P.

(57) ABSTRACT

A lens of a vehicular headlight is mounted on a vehicle and includes an incident surface through which light from a light source enters and an emission surface from which light entered from the incident surface is emitted. At an upper edge area including an upper end in an on-board state, the emission surface has a shape allowing a portion of light entered through the incident surface and reached the upper edge area to be internally reflected rearward in the on-board state after being internally reflected toward the incident surface side from the emission surface and internally reflected toward the emission surface side from the incident surface.

6 Claims, 5 Drawing Sheets

(51) Int. Cl.

| | |
|---|---|
| ***F21S 41/25*** | (2018.01) |
| ***F21S 41/255*** | (2018.01) |
| ***F21S 41/265*** | (2018.01) |
| ***F21S 41/275*** | (2018.01) |
| ***F21S 41/32*** | (2018.01) |
| ***F21S 41/365*** | (2018.01) |
| ***F21S 41/43*** | (2018.01) |
| ***F21V 7/00*** | (2006.01) |

(52) U.S. Cl.
CPC ............. *F21S 41/365* (2018.01); *F21S 41/43* (2018.01); *F21S 41/25* (2018.01); *F21S 41/255* (2018.01); *F21S 41/265* (2018.01); *F21S 41/275* (2018.01); *F21S 41/322* (2018.01); *F21V 7/0091* (2013.01)

(56) References Cited

FOREIGN PATENT DOCUMENTS

| | | | | | | |
|---|---|---|---|---|---|---|
| EP | 2187115 | A2 | * | 5/2010 | .......... | F21S 48/1154 |
| JP | 2008-226542 | A | | 9/2008 | | |
| JP | 2010-118241 | A | | 5/2010 | | |
| JP | 2011181365 | A | * | 9/2011 | | |
| JP | 2013225401 | A | * | 10/2013 | | |
| JP | 2014-165088 | A | | 9/2014 | | |
| JP | 2015-032454 | A | | 2/2015 | | |
| JP | 2016-15215 | A | | 1/2016 | | |
| JP | 2017-033661 | A | | 2/2017 | | |
| JP | 2019040677 | A | * | 3/2019 | | |

OTHER PUBLICATIONS

Machine translation of JP 2019040677 A retrieved from the FIT database of PE2E search. (Year: 2023).*

Machine translation of AT 512181 B1 retrieved from the FIT database of PE2E search. (Year: 2024).*

Machine translation of JP 2013225401 A retrieved from the FIT database of PE2E search. (Year: 2024).*

Machine translation of JP 2019040677 A retrieved from the FIT database of PE2E search. (Year: 2024).*

International Search Report mailed on Nov. 2, 2020 in PCT/JP2020/031465 filed on Aug. 20, 2020, 2 pages).

Extended European Search Report issued on Aug. 8, 2023 in corresponding European Application No. 20854882.6, 8 pages.

Office Action issued Mar. 22, 2023, in corresponding Japanese Patent Application No. 2019-150595 (with English Translation), 11 pages.

Office Action issued Mar. 6, 2024, in corresponding Chinese Patent Application No. 202080057926.8 (with machine Translation), 11 pages.

European Office Action dated Sep. 12, 2024, in European patent Application No. 20854882.6, 6 pages.

* cited by examiner

LENS FOR VEHICULAR HEADLIGHT, AND VEHICULAR HEADLIGHT

TECHNICAL FIELD

The present invention relates to a lens of a vehicular headlight and a vehicular headlight.

BACKGROUND ART

A known vehicular headlight includes a light source, a reflector that reflects light from the light source, and a lens that receives light reflected by the reflector through an incident surface and emits the light through an emission surface to an illuminated area in front of the vehicle (for example, see PTL 1).

CITATION LIST

Patent Literature

PTL 1: Japanese Unexamined Patent Publication No. 2016-15215

SUMMARY OF THE INVENTION

Problems to be Solved by the Invention

In a vehicular headlight such as the one mentioned above, the incident light entered through the incident surface of the lens may partially be reflected internally from the emission surface toward the incident surface side. The internally reflected light may further be reflected internally from the incident surface toward the emission surface side and reach an upper part of the emission surface, where the light may be emitted upward from the upper part of the emission surface. The light emitted in this way may become glare light. For this reason, there is a need for a lens that can suppress the generation of glare light.

The present invention has been made in view of the above, and aims to provide a lens of a vehicular headlight and a vehicular headlight capable of suppressing the generation of glare light.

Means for Solving the Problem

A lens of a vehicular headlight according to the present invention is a lens of a vehicular headlight mounted on a vehicle, the lens of the vehicular headlight including an incident surface through which light from a light source enters, and an emission surface through which the light entered from the incident surface is emitted, in which, at an upper edge area including the upper end in an on-board state, the emission surface has a shape allowing a portion of light entered through the incident surface and reached the upper edge area to be internally reflected rearward in the on-board state after being internally reflected toward the incident surface side from the emission surface and internally reflected toward the emission surface side from the incident surface.

The emission surface may have a circular shape when seen from the front in the on-board state.

The upper edge area may be shaped along a plane perpendicular to an optical axis or a plane having its upper part in the on-board state tilted at a predetermined angle toward the light source side relative to the plane perpendicular to the optical axis.

The emission surface may include a main illuminating area that emits light entered through the incident surface toward the front of the vehicle to form a main illuminating pattern, and the upper edge area may be located over the main illuminating area and has a shape allowing the light entered through the incident surface and directly reached the upper edge area to be emitted toward the front of the vehicle to above the main illuminating pattern to form an auxiliary illuminating pattern.

The incident surface may include a corresponding area corresponding to the upper edge area, and the corresponding area may have a shape allowing a focal point, which is formed by the corresponding area and the upper edge area, of a lens portion to be located below the focal point of the remaining lens portion.

A vehicular headlight according to the present invention includes a light source, a reflector that reflects light from the light source, and a lens of the vehicular headlight that emits light reflected from the reflector toward the front of the vehicle.

Effect of the Invention

According to the present invention, the generation of glare light can be suppressed.

MODE FOR CARRYING OUT THE INVENTION

In the following, an embodiment of a lens of a vehicular headlight and a vehicular headlight will be described with reference to the accompanying drawings. The present invention is not limited by the embodiment. Constituent components in the following embodiment include those that are substitutable and easy to be replaced by those skilled in the art, or those that are substantially identical. In the following description, the front-rear, up-down, and right-left directions indicate directions in an on-board state in which a vehicular headlight is mounted on the vehicle, and also the directions when seen from a driver seat in the direction of travel of the vehicle. In the present embodiment, the up-down direction is parallel to the vertical direction and the right-left direction is the horizontal direction.

Figure 1:
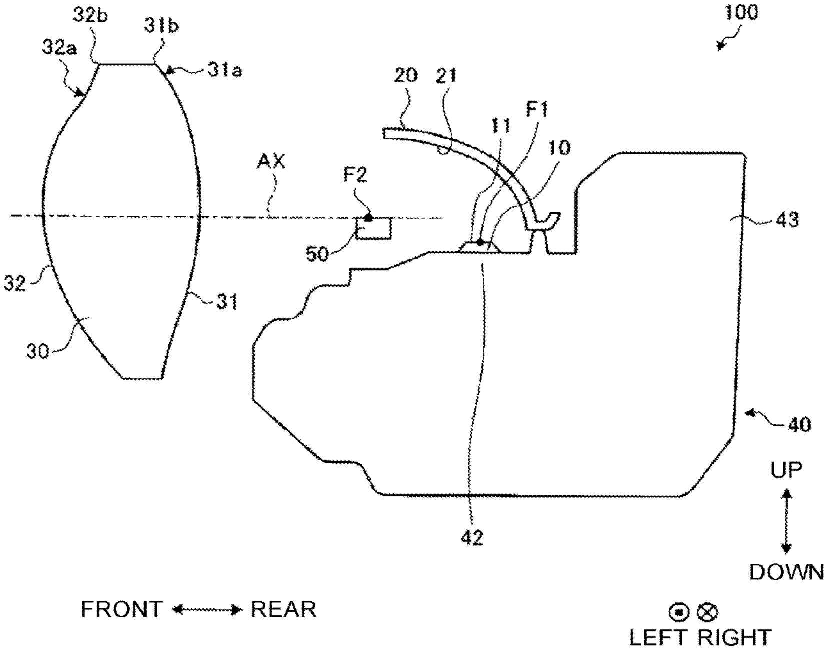
FIG. 1 illustrates an example of a vehicular headlight.

FIG. 1 illustrates an example of a vehicular headlight 100 according to the present embodiment. As illustrated in FIG. 1, a vehicular headlight 100 includes a light source 10, a reflector 20, a lens 30, a heat dissipating member 40, and a shade 50. The light source 10, the reflector 20, the lens 30, the heat dissipating member 40, and the shade 50 constitute a so-called projector-type lamp unit.

The vehicular headlight 100 is mounted on the left and right sides of the front of the vehicle. When mounted on the vehicle, the vehicular headlight 100 is housed in a light chamber formed by a lamp housing and a lamp lens (for example, a plain outer lens or the like), which are not illustrated, and is connected to an optical axis adjustment mechanism which is not illustrated. The optical axis adjustment mechanism can adjust the optical axis of the vehicular headlight 100 in the vertical and horizontal directions.

In the light chamber, a clearance lamp unit, a turn signal lamp unit, a daytime running lamp unit, and the like, for example, may be disposed in addition to the above lamp unit. An inner panel (not illustrated), an inner housing (not illustrated), an inner lens (not illustrated), and the like may also be disposed in the light chamber.

In the present embodiment, the light source 10 is a semiconductor-type light source such as an LED or an OLED (organic EL). The light source 10 has a light emitting surface 11. The light source 10 emits light so that the light emitting surface 11 forms a Lambertian distribution. When the vehicular headlight 100 is mounted on the vehicle, the light emitting surface 11 is directed, for example, upward and parallel to the horizontal plane.

The light source 10 is fixed to a light source fixing portion 42 of the heat dissipating member 40. The light source fixing portion 42 is connected to a fin 43. The fin 43 includes fins which are not illustrated. Accordingly, the heat generated in the light source 10, which is a semiconductor-type light source, is dissipated from the light source fixing portion 42 to the outside through the fin 43. The light source fixing portion 42 and the fin 43 may be integrally formed as a heat sink.

The reflector 20 reflects light from the light source 10 toward the lens 30. The reflector 20 is disposed above the light source 10 and is made of a heat-resistant and light-impervious material, such as a resin material. The reflector 20 is fixed to the heat dissipating member 40 with a fixing member such as a screw.

The reflector 20 has a hollow shape with open front and lower portions, closed rear and upper portions, and closed right and left sides. A reflecting surface 21 is formed on the inner surface of the reflector 20. The reflecting surface 21 reflects the light from the light source 10 toward the lens 30.

The reflecting surface 21 is a surface of an ellipsoid of revolution or a freeform surface based on the ellipsoid of revolution. In the present embodiment, the reflecting surface 21 is an elliptical reflecting surface having focal point F1 and focal point F2. The focal point F1 is located at or near the center of the light emitting surface 11 of the light source 10. The focal point F2 is located at a position overlapping a focal point of the lens 30 which will be described later.

The shade 50 is made of a material such as a metal plate that can block light from the light source 10. The shade 50 is disposed between the light source 10 and the lens 30. The shade 50 is connected to a drive unit which is not illustrated, and may be movable between a first position where a portion of the light reflected by the reflector 20 is blocked and a second position where the portion of the light is not blocked.

The lens 30 is disposed ahead of the reflector 20 in the vehicle. The lens 30 is made of a resin material such as polycarbonate resin or acrylic resin. The lens 30 is supported by, for example, a lens holder which is not illustrated. The lens 30 has a focal point (not illustrated) and an optical axis (lens optical axis) AX. The optical axis AX of the lens 30 matches or nearly matches the optical axis of the reflector 20. The lens 30 emits the reflected light from the reflecting surface 21 toward the front of the vehicle.

The lens 30 includes an incident surface 31 and an emission surface 32. The incident surface 31 receives reflected light from the reflector 20. The incident surface 31 has an aspheric shape which is convex toward the light source 10 side. The incident surface 31 has a corresponding area 31*a* at its upper part. The corresponding area 31*a* is a region corresponding to the upper edge area 32*a* of the emission surface 32 which will be described later. The detailed configuration of the corresponding area 31*a* will be described later.

The emission surface 32 emits light entered through the incident surface 31 toward the front of the vehicle. The emission surface 32 as a whole has a convex shape toward the side opposite to the light source 10. The emission surface 32 has an upper edge area 32*a* including an upper end portion 32*b*. The upper edge area 32*a* is a concave portion having a concave shape toward the light source 10 side.

Figure 2:
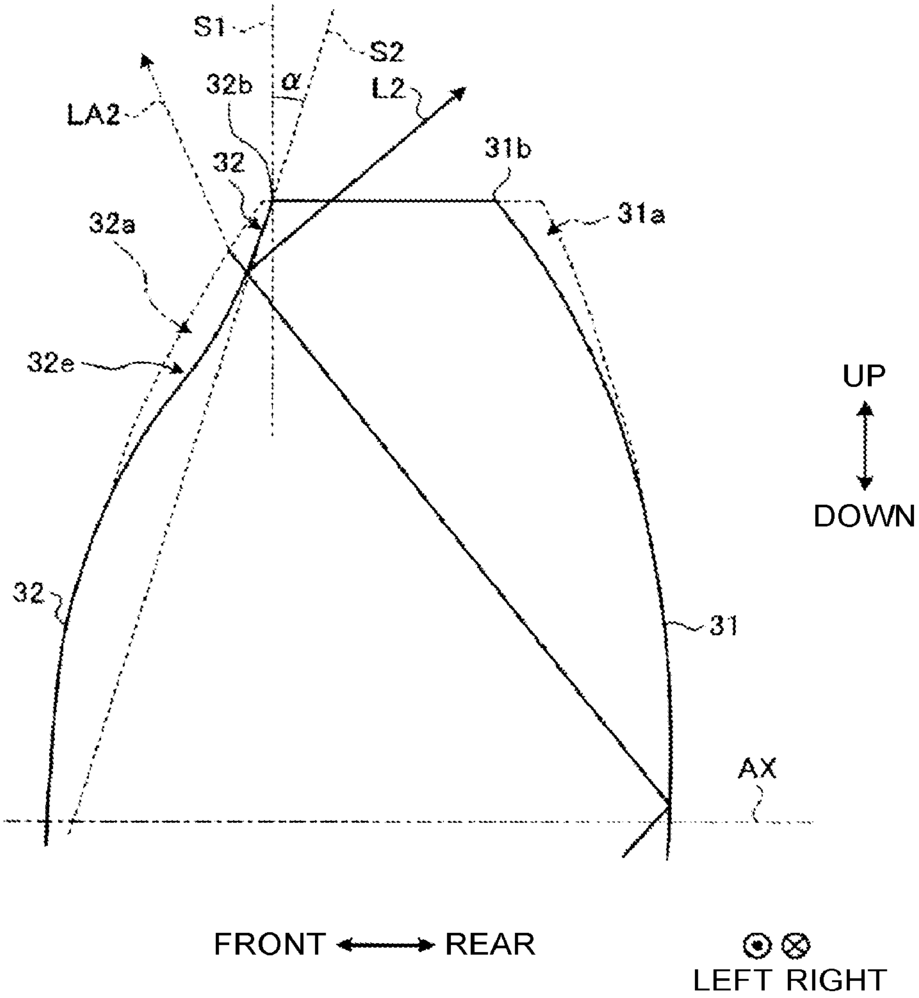
FIG. 2 is a cross-sectional view of an example of an upper part of the lens.
Figure 3:
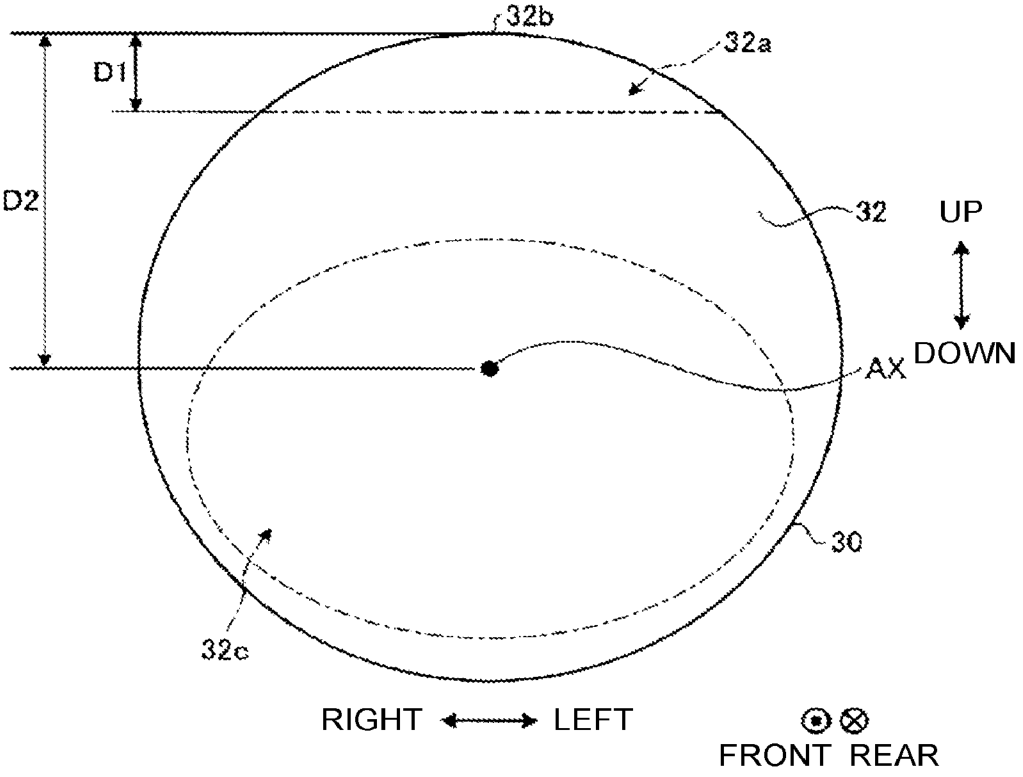
FIG. 3 illustrates an example of the lens when seen from the front of the vehicle.

FIG. 2 is a cross-sectional view of an example of the upper part of the lens 30. FIG. 3 illustrates an example of the lens 30 as seen from the front of the vehicle. As illustrated in FIGS. 2 and 3, in the present embodiment, the range of the upper edge area 32*a* of the emission surface 32 extends downward (toward the optical axis AX side) from the upper end portion 32*b* to a position away from the upper end portion 32*b* by a predetermined distance D1, and spans the entire length in the right-left direction. A distance from the optical axis AX to the upper end portion 32*b* of the upper edge area 32*a*, or a ratio of the predetermined distance D1 to a radius D2 of the lens 30 can be, for example, 10% or more and 20% or less. The ratio of distance D1 to distance D2 is not limited to the above, and can be set to other values.

The upper edge area 32*a* is located over the main illuminating area 32*c*. The main illuminating area 32*c* emits light entered through the incident surface 31 toward the front of the vehicle to form a main illuminating pattern P1 (see FIG. 8). In present embodiment, the main illuminating pattern includes, for example, a low beam pattern.

The upper edge area 32*a* includes a rearward reflective portion 32*d* formed downward from the upper end portion 32*b*. The rearward reflective portion 32*d* internally reflects light L2 rearward, which is a portion of light entered through the incident surface 31 and reached the upper edge area 32*a* after being internally reflected toward the incident surface 31 side from the emission surface 32 and internally reflected toward the emission surface 32 side from the incident surface 31, in the on-board state.

The rearward reflective portion 32*d* has a shape, for example, along a plane S1 perpendicular to the optical axis AX or a plane S2 having its upper side in the on-board state tilted at a predetermined angle $\alpha$ toward the light source 10 side relative to the plane S1. The rearward reflective portion 32*d* can be a flat or curved surface. The predetermined angle $\alpha$ can be, for example, an angle larger than 0 degree and smaller than 15 degrees.

The lower end side of the rearward reflective portion 32*d* is formed with a connecting portion 32*e* connecting to the main illuminating area 32*c* of the emission surface 32. The connecting portion 32*e* includes a portion that gradually increases the amount of protrusion toward the front of the vehicle (convex shape toward the rear of the vehicle) downward from the lower end of the rearward reflective portion 32*d*, followed by a portion that gradually decreases the amount of protrusion (convex shape toward the front of the vehicle). With this configuration, there is a smooth connection from the main illuminating area 32*c* to the rearward reflective portion 32*d*.

Figure 4:
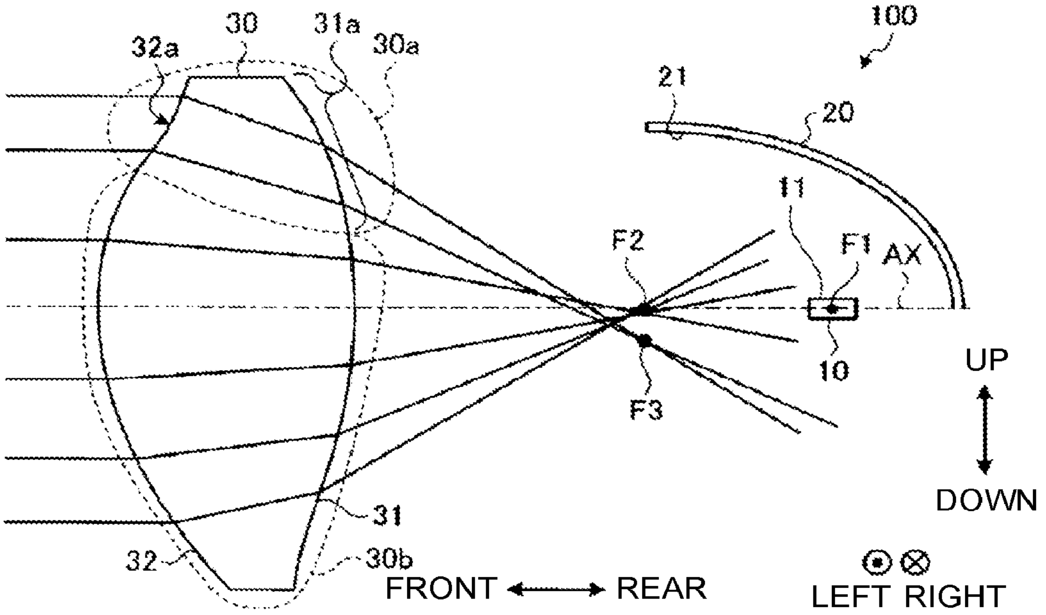
FIG. 4 is a view for explaining focal points of the lens.

FIG. 4 is a view for explaining the focal points of the lens 30. In FIG. 4, light rays passing through the lens 30 do not represent the light from the light source 10, but indicate typical light paths passing through the focal points of the lens 30. The corresponding area 31*a* of the incident surface 31 is provided in a range corresponding to the upper edge area 32*a*. The corresponding area 31*a* has a shape such that a focal point F3 of the lens portion 30*a*, which is formed by the corresponding area 31*a* and the upper edge area 32*a*, is located below the focal point F2 of the remaining lens portion 30*b*. The corresponding area 31*a* has a shape such that, when the light coming from the focal point F3 is incident on the corresponding area 31*a*, the light incident on the corresponding area 31*a* is emitted from the upper edge area 32*a* to form an auxiliary illuminating pattern P2 in front of the vehicle (see FIG. 8). The auxiliary illuminating pattern P2 is, for example, an overhead pattern. Such a shape of the corresponding area 31*a* is formed in a manner that, as it moves upward to reach the upper end 31*b*, for example, the amount of curvature toward the front of the vehicle increases.

In the vehicular headlight 100 configured as described above, the light source 10 is in the off-state, for example, when the lighting switch installed in the vehicle is turned off. In this state, when the light switch is turned on, the light source 10 is lit. When the light source 10 is lit, the light is emitted from the light emitting surface 11 and reflected from the reflecting surface 21 of the reflector 20 toward the lens 30 side. The light reflected from the reflector 20 enters the incident surface 31.

Figure 5:
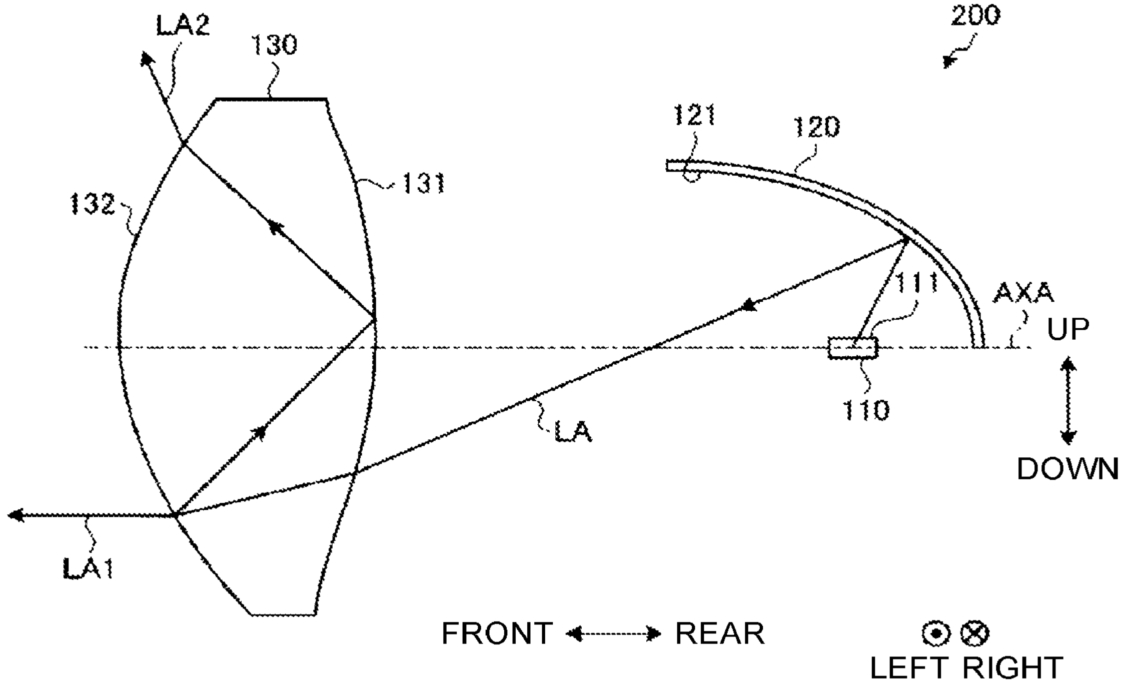
FIG. 5 illustrates an example of a vehicular headlight according to a comparative example.

FIG. 5 illustrates an example of a vehicular headlight 200 according to a comparative example. The vehicular headlight 200 includes a light source 110, a reflector 120, and a lens 130 (optical axis AXA). The lens 130 includes an incident surface 131 and an emission surface 132. Unlike the vehicular headlight 100 according to the present embodiment, the emission surface 132 does not have the upper edge area with the rearward reflective portion, and the incident surface 131 does not have the corresponding area. Other portions of the configuration of the vehicular headlight 200 can be the same as those of the vehicular headlight 100.

In the vehicular headlight 200, when light LA reflected from the reflector 120 enters the incident surface 131, a portion of light LA1 is emitted from the emission surface 132, but a portion of light LA2 may be internally reflected from the emission surface 132 toward the incident surface 131 side. The internally reflected light LA2 may further be internally reflected from the incident surface 131 toward the emission surface 132 side to reach the upper part of the emission surface 132, and may be emitted from the upper part of the emission surface 132. The light LA2 emitted in this way may become glare light.

Figure 6:
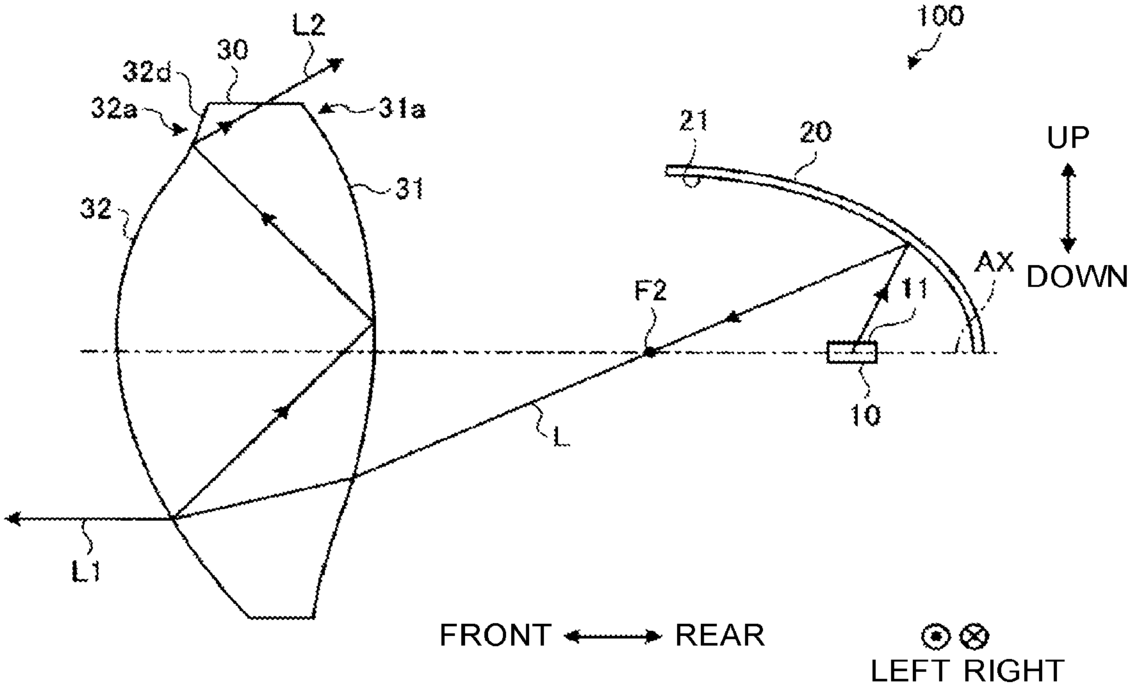
FIG. 6 illustrates an example of a vehicular headlight according to the present embodiment.
Figure 8:
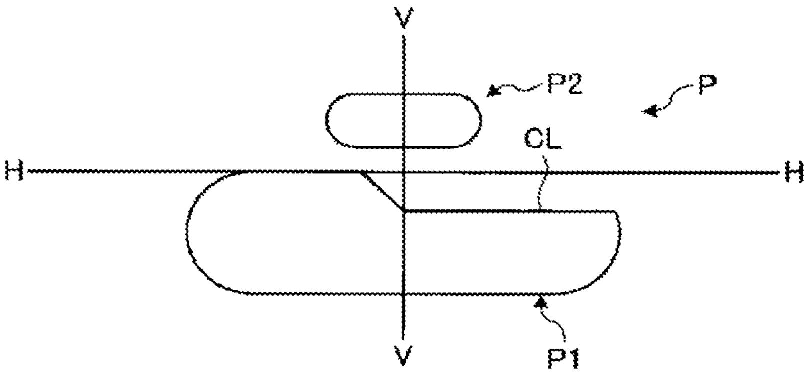
FIG. 8 illustrates an example of a headlight illuminating pattern illuminated by a vehicular headlight.

FIG. 6 illustrates an example of the vehicular headlight 100 according to the present embodiment. As illustrated in FIG. 6, in the vehicular headlight 100 according to the present embodiment, when the light L reflected from the reflector 20 is incident on the incident surface 31, a portion of light L1 is emitted from the emission surface 32. FIG. 8 illustrates an example of a headlight illuminating pattern P illuminated by the vehicular headlight. Line H-H in FIG. 8 represents the horizontal plane, and line V-V represents a line perpendicular to the horizontal plane and indicating the center of the vehicle. The light L1 emitted from the emission surface 32 forms the main illuminating pattern P1, such as a low beam pattern with cutoff line CL as illustrated in FIG. 8, in front of the vehicle.

Like the case of the above comparison example, the light portion L2 may be internally reflected from the emission surface 32 toward the incident surface 31 side. In the present embodiment, the internally reflected light L2 is further reflected internally from the incident surface 31 toward the emission surface 32 side to reach the upper part of the emission surface 32, but is reflected rearward from the rearward reflective portion 32*d* of the upper edge area 32*a* of the emission surface 32. The light L2 reflected from the rearward reflective portion 32*d* is emitted from the upper part or the incident surface 31 of the lens 30 to the outside and absorbed by a member such as a housing which is not illustrated. Thus, reflecting the light L2 to the rear of the vehicle from the rearward reflective portion 32*d* suppresses the generation of glare light.

Figure 7:
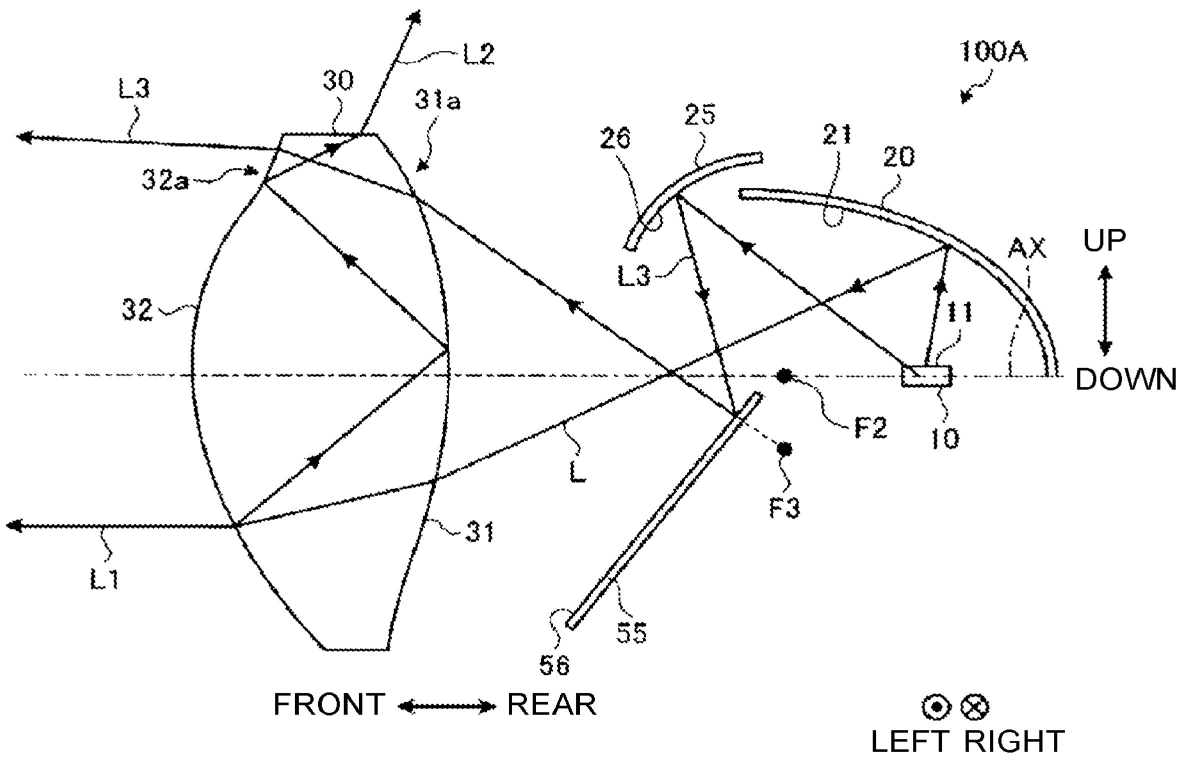
FIG. 7 illustrates a vehicular headlight according to another example.

FIG. 7 illustrates a vehicular headlight 100A according to another example. As illustrated in FIG. 7, the vehicular headlight 100A includes the light source 10, the reflector 20, and the lens 30, as in the vehicular headlight 100 described above. The vehicular headlight 100A also includes a sub-reflector 25 and a shade 55.

The sub-reflector 25 is disposed on the front side of the vehicle relative to the reflector 20. The sub-reflector 25 has a reflecting surface 26. The reflecting surface 26 is, for example, a surface of an ellipsoid of revolution or a freeform surface based on the ellipsoid of revolution. The reflecting surface 26 reflects light L3, which is a portion of the light L from the light source 10 sticking out toward the front of the vehicle from the reflecting surface 21 of the reflector 20, toward the shade 55.

The shade 55 is, for example, a flat plate that shades a portion of the light L reflected from the reflecting surface 21 of the reflector 20 on the rear side of the vehicle. In addition, the shade 55 has a reflecting surface 56 on the front side of the vehicle. The reflecting surface 56 reflects the light L3 reflected from the sub-reflector 25 to the lens 30 side.

The sub-reflector 25 and the shade 55 are disposed such that the light L3 reflected from the shade 55 travels toward the lens portion 30*a* along the light path from the focal point F3 to the lens portion 30*a* of the lens 30. With this configuration, the light L3 is incident on the incident surface 31, or the corresponding area 31*a*, of the lens portion 30*a*. The light L3 incident on the corresponding area 31*a*, when reaching the emission surface 32 or the upper edge area 32*a*, is emitted from the upper edge area 32*a* without being internally reflected. The light L3 emitted from the upper edge area 32*a* forms the auxiliary illuminating pattern P2, such as an overhead pattern as illustrated in FIG. 8, in front of the vehicle. In this way, by using the light that reaches a position in the upper edge area 32*a* outside the main illuminating area 32*c* that forms the main illuminating pattern P1, the auxiliary illuminating pattern P2 which is different from the main illuminating pattern P1 can be formed in front of the vehicle.

As described above, the lens 30 of the vehicular headlight 100 according to the present embodiment is the lens 30 of the vehicular headlight 100 mounted on the vehicle, including the incident surface 31 through which the light from the light source 10 enters, and the emission surface 32 through which the light entered from the incident surface 31 is emitted, in which, at the upper edge area 32*a* including the upper end in the on-board state, the emission surface 32 has the shape allowing the portion of the light entered through the incident surface 31 and reached the upper edge area 32*a* to be internally reflected rearward in the on-board state after being internally reflected toward the incident surface 31 side from the emission surface 32 and internally reflected toward the emission surface 32 side from the incident surface 31. The vehicular headlight 100 according to the present embodiment includes the light source 10, the reflector 20 that reflects the light from the light source 10, and the lens 30 described above that emits the light reflected from the reflector 20 toward the front of the vehicle.

With this configuration, when the light portion L2 incident on the incident surface 31 can be internally reflected from the emission surface 32 toward the incident surface 31 side, and further be reflected internally from the incident surface 31 toward the emission surface 32 side to reach the upper part of the emission surface 32, the light L3 can be reflected rearward from the rearward reflective portion 32*d* of the upper edge area 32*a* on the emission surface 32. This decreases the emission of the light L3 from the emission surface 32, thus suppressing the generation of glare light.

In the lens 30 of the vehicular headlight 100 according to the present embodiment, the emission surface 32 has a circular shape when seen from the front in the on-board state. This suppresses the glare light while maintaining the circular appearance when seen from the front.

In the lens 30 of the vehicular headlight 100 according to the present embodiment, the upper edge area 32*a* may have the shape along the plane perpendicular to the optical axis AX or the plane having its upper side in the on-board state tilted at the predetermined angle toward the light source 10 side relative to the plane perpendicular to the optical axis AX. This ensures reliable rearward reflection of the light that has reached the upper edge area 32*a* after being internally reflected from the lens 30.

In the lens 30 of the vehicular headlight 100 according to the present embodiment, the emission surface 32 has the main illuminating area 32*c* that emits the light entered from the incident surface 31 toward the front of the vehicle to form the main illuminating pattern P1, and the upper edge area 32*a* is located over the main illuminating area 32*c* and has a shape allowing the light entered from the incident surface 31 and directly reached the upper edge area 32*a* to be emitted toward the front of the vehicle to above the main illuminating pattern P1 to form the auxiliary illuminating pattern P2. With this configuration, by using the light that reaches the position in the upper edge area 32*a* outside the main illuminating area 32*c* that forms the main illuminating pattern P1, the auxiliary illuminating pattern P2 which is different from the main illuminating pattern P1 can be formed in front of the vehicle.

In the lens 30 of the vehicular headlight 100 according to the present embodiment, the incident surface 31 includes the corresponding area 31*a* corresponding to the upper edge area 32*a*, and the corresponding area 31*a* has the shape such that the focal point F3 of the lens portion 30*a* formed by the corresponding area 31*a* and the upper edge area 32*a* is located below the focal point of the remaining lens portion 30*b*. With this configuration, a larger amount of light can reach the corresponding area 31*a* by traveling the light from the light source 10 along the optical path connecting, for example, the focal point P3 and the lens portion 30*a*.

The technical scope of the present invention is not limited to the above embodiment, and changes may be made as appropriate without departing from the spirit of the present invention. For example, in the above embodiment, the configuration in which the incident surface 31 of the lens 30 has the corresponding area 31*a* has been described, not in the limited sense, as the example. The corresponding area 31*a* may not be provided, or may be provided in a limited range, for example, corresponding to a part of the upper edge area 32*a*.

Furthermore, in the above embodiment, the configuration in which the lens 30 has a circular shape when seen from the front of the vehicle has been described, not in the limited sense, as the example. The lens 30 may have a different shape other than the circular shape when seen from the front of the vehicle.

DESCRIPTION OF REFERENCE NUMERALS

AX . . . Optical axis
CL . . . Cutoff line
D1, D2 . . . Distance
F1, F2, F3 . . . Focal point
L, L1, L2, L3, LA, LA1, LA2 . . . Light
P . . . Headlight illuminating pattern
P1 . . . Main illuminating pattern
P2 . . . Auxiliary illuminating pattern
S1, S2 . . . Plane
10, 110 . . . Light source
11 . . . Light emitting surface
20, 120 . . . Reflector
21, 26, 56 . . . Reflecting surface
25 . . . Sub-reflector
30, 130 . . . Lens
30*a* . . . Lens portion
30*b* . . . Portion
31, 131 . . . Incident surface
31*a* . . . Corresponding area
31*b* . . . Upper end
32, 132 . . . Emission surface
32*a* . . . Upper edge area
32*b* . . . Upper end portion
32*c* . . . Main illuminating area
32*d* . . . Rearward reflective portion
32*e* . . . Connecting portion
40 . . . Heat dissipating member
41 . . . Lens holder
42 . . . Light source fixing portion
43 . . . Fin
50, 55 . . . Shade
100, 100A, 200 . . . Vehicular headlight

The invention claimed is:

1. A lens body having a focal point and an optical axis, of a vehicular headlight mounted on a vehicle, comprising:

an incident surface on which light from a light source enters, the incident surface being an entire surface of the lens body on the side of the light source, and the entire surface being a convex surface toward the side of the light source; and an emission surface that is an entire surface of the lens body on the side opposite to the side of the light source and emits the light which enters on the incident surface from the light source, toward the front of the vehicle, the emission surface corresponding to the incident surface, wherein the emission surface includes an upper edge area which is a part of the emission surface and includes an upper end of the lens body in an on-board state, the part of the emission surface having a shape configured such that a portion of the light entered on the incident surface and which reached the upper edge area after being internally reflected toward the incident surface side from the emission surface and then internally reflected toward the emission surface side from the incident surface, is internally reflected rearward in the on-board state to suppress generation of glare light, wherein the emission surface includes a main illuminating area that emits light entered through the incident surface toward the front of the vehicle to form a main illuminating pattern, and the upper edge area is located over the main illuminating area and has a shape allowing the light entered through the incident surface and directly reached the upper edge area to be emitted toward the front of the vehicle to above the main illuminating pattern to form an auxiliary illuminating pattern, and wherein the incident surface includes a corresponding area opposite to the upper edge area, and the corresponding area has a shape forming a focal point of the upper edge area of the lens body, which is formed by the corresponding area and the upper edge area collectively, and located below the focal point of the lens body.

2. The lens body of the vehicular headlight according to claim 1, wherein the emission surface has a circular shape when seen from the front in the on-board state.

3. The lens body of the vehicular headlight according to claim 1, wherein the upper edge area is shaped along a plane perpendicular to the optical axis or a plane having its upper part in the on-board state tilted at a predetermined angle toward the light source side relative to the plane perpendicular to the optical axis.

4. The lens body of claim 2, wherein:

said optical axis is provided at a center of the circular shape such that a radial distance from the optical axis to the upper end portion of the emission surface has a distance D2, said upper edge area of the emission surface is provided along a distance D1 from the upper end portion to a position away from the upper end portion toward the optical axis by the distance D1, and D1≤20% of D2.

5. The lens body of claim 1, wherein the upper edge area of the emission surface has a localized convex shape toward the side opposite to the light source.

6. A vehicular headlight comprising:

a light source;

a reflector that reflects light from the light source; and the lens body of the vehicular headlight according to claim 1 that emits the light reflected from the reflector toward the front of the vehicle.

* * * * *